Figure 1:
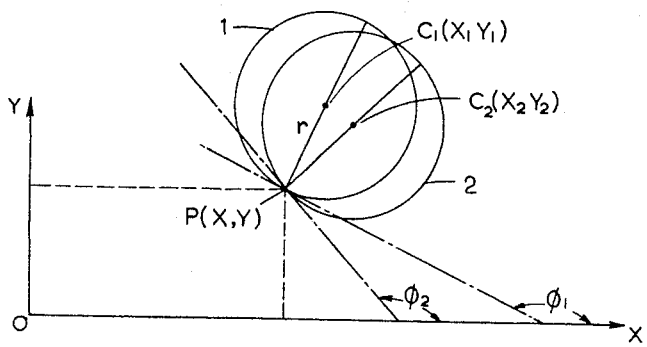

Nov. 22, 1960  R. E. SPENCER ET AL  2,961,161
CONTROL DEVICES FOR AUTOMATIC MACHINE TOOLS
Filed July 15, 1957  2 Sheets-Sheet 1

Inventors
R.E. Spencer
R. Voles

United States Patent Office 2,961,161
Patented Nov. 22, 1960

2,961,161

CONTROL DEVICES FOR AUTOMATIC MACHINE TOOLS

Rolf Edmund Spencer, West Ealing, London, and Roger Voles, Chiswick, London, England, assignors to Electric & Musical Industries Limited, Hayes, Middlesex, England, a company of Great Britain Filed July 15, 1957, Ser. No. 672,060

Claims priority, application Great Britain July 18, 1956

6 Claims. (Cl. 235—197)

This invention relates to control devices for automatic machine tools and relates especially, though not exclusively, to control devices for automatic electronically controlled milling machines.

There have been various proposals concerning such above-mentioned devices some of which proposals make use of interpolating means for deriving signals representative of points on a parabolic curve defined by three reference points representations of which are fed to the interpolating means. The input to such an interpolating means is derived from a predetermined programme and is applied cyclically in groups of three signals so that the output from the interpolating means is substantially continuous in its representation of a required curve. This output may be used to control the relative displacement in one co-ordinate direction between the axes of two components of a machine tool, for example a worktable and a cutting tool.

It may be required that part of the locus of the relative displacement between the two components of a machine tool is a circular arc. A circular arc may be approximated to by a parabolic arc but not to a sufficient degree of accuracy independently of the angle subtended by the circular arc at its centre.

The object of the present invention is to provide control means for automatic machine tools such that part of the required locus of the relative displacement between two components of a machine tool may be a circular arc of sufficiently high accuracy regardless of the angle subtended by the arc at its centre.

According to the present invention there is provided a control device for automatic machine tools comprising means for deriving first signals representing two co-ordinates of a position on a desired locus with respect to predetermined axes, means for resolving signals representing a radius to produce signals representing components in said two co-ordinate directions, means responsive to said resolving means for adding said component signals to said first signals to derive control signals, means for discontinuing the derivation of said first signals, means for deriving signals representing the co-ordinates of a fixed point during a period of discontinuation, means for deriving signals representing a further radius associated with said fixed point, means for applying said signals representing a further radius to said resolving means during a period of discontinuation, whereby further control signals representing the two co-ordinates of points on a circular arc are derived during a period of discontinuation.

The invention is especially applicable to automatic machine tools having means for compensating for the radius of a tool, or a departure of the radius of the tool from a nominal dimension, such as described for example in the specification of co-pending United States application Serial Number 524,720, now Patent No. 2,917,693. Such compensating means comprises a resolver which (assuming that compensation is made for the radius of the tool) resolves the radius into components which are added to the co-ordinates of a point on the profile to be cut to derive control signals for producing relative displacement between the tool holder and work carrier. The compensating means in effect produces a rotation of the tool (in a plane perpendicular to the axis thereof) about an instantaneous centre at the point of contact between the tool and a workpiece.

In accordance with a feature of the invention means are provided for conditioning the resolver means to function either solely as a cutter radius compensator or as a means for causing the tool to cut a circular arc about any desired centre.

Evidently, if the machine embodies other means for deriving control signals, such for example as interpolating means, as described in the second paragraph of this specification, provision is required for disabling or modifying the function of such other means, when the resolver is functioning as a means for causing the tool to cut a circular arc. For example such other means may be conditioned to define the limit of the circular arc to be cut.

The tool radius compensating means of the afore-mentioned applications is described with reference to a milling machine employing cylindrical co-ordinates to specify relative displacements and while the invention is applicable to such applications, in the following description one example of the invention will be described with reference to a machine tool which is of the general construction described in the specification of co-pending United States application Serial Number 581,038, now Patent No. 2,929,555, and in which cartesian co-ordinates are employed.

Figure 2:
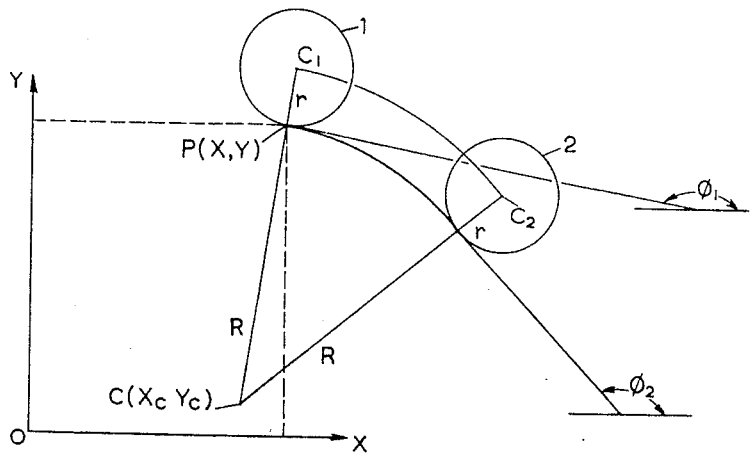

In order that the invention may be clearly understood and readily carried into effect, the invention will be described with reference to the accompanying drawings, in which:

Figure 1 illustrates the operation of the example of the afore-mentioned applications as referred to cartesian co-ordinates, and Figure 2 illustrates the operation of the example of Figure 1 according to the present invention.

Figure 3:
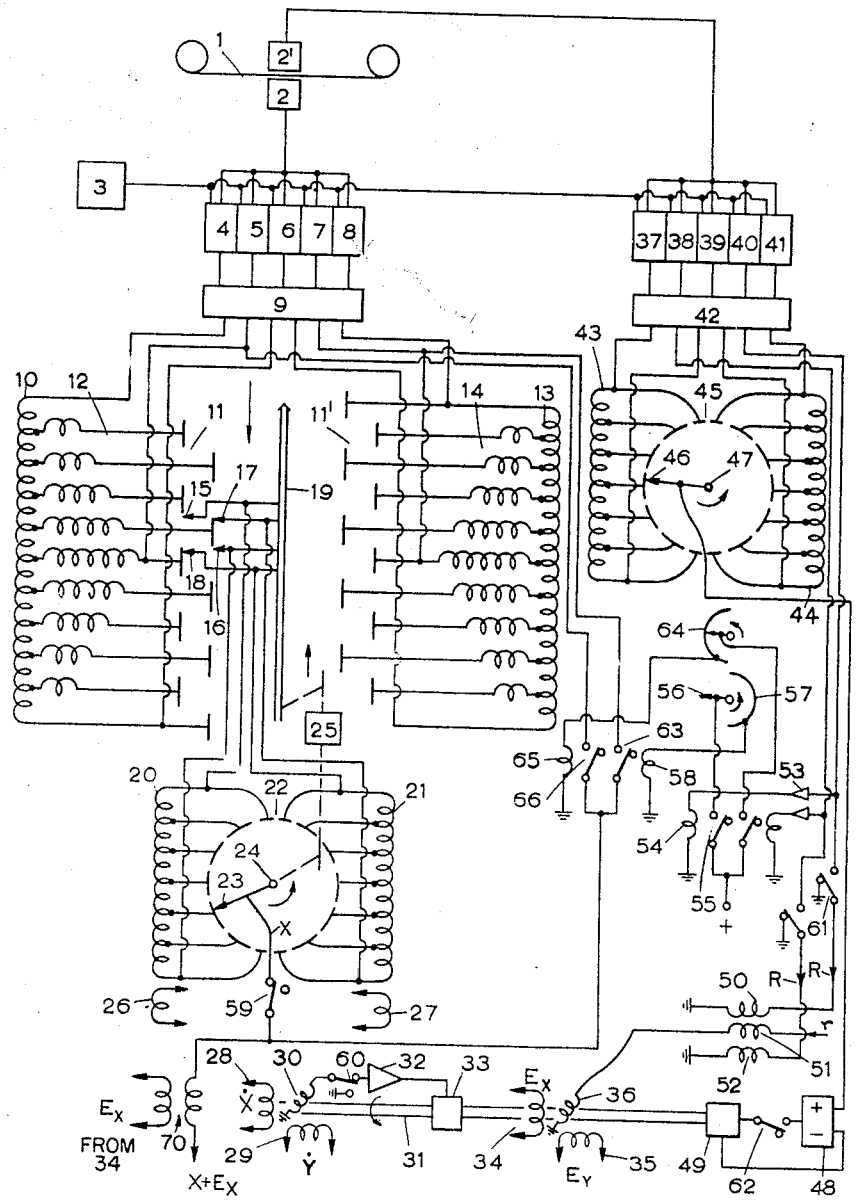

Reference will also be made to the single figure of the accompanying drawings, denoted for convenience as Figure 3, which illustrates one example of the present invention.

In Figure 1, reference 1 represents the circular cutting tools, centre $C_1$, of an automatic milling machine controlled by a quadratic interpolating device such as described, for example, in the specification of co-pending United States application Serial Number 581,038, now Patent No. 2,929,555, wherein two signals are derived representative of the two cartesian co-ordinates X and Y, say, of points on the required profile to be cut by the cutting tool of the milling machine with respect to the origin of the co-ordinate system employed. The moving component of the milling machine may, of course, be the workpiece holder, as is considered in the last-mentioned application.

However, some account must be taken of the radius $r$ of the cutting tool in the (X, Y)-plane and a compensating means for doing this is described in the specification of co-pending United States application Serial Number 524,720, now Patent No. 2,917,693. If, in Figure 1, a change of direction of the cutting tool 1 is required at the point P (X, Y) on the profile such that the cutting tool needs to change to a position indicated by the reference 2, then according to the latter mentioned applications the cutting tool is effectively rotated about the point P as instantaneous centre. Clearly, allowance must be made for the radius of the cutting tool at all times during operation and the rotation from position 1 to 2 is caused by addenda $X_2-X_1$ and $Y_2-Y_1$ to the X and Y outputs derived from the interpolating devices, where $(X_1, Y_1)$ and $(X_2, Y_2)$ are the positions of the centre of the cutting tool $C_1$ and $C_2$ respectively. This assumes of course that at position 1, $X_1$–$X$ and $Y_1$–$Y$ are added respectively to X and Y to derive control signals defining the position $C_1$ of the cutter centre. Of course, similar considerations apply if there is a continuous change in the direction of the cutting tool. The components of the additional displacements are derived as described in the latter mentioned applications by employing a resolver the rotor of which is maintained at the angle $\phi$ between the instantaneous direction of motion of the cutting tool and the X-direction, say, and is fed with a signal representative of the radius $r$ of the cutting tool. The angle $\phi$ may be derived from the derivatives of the cutting tool co-ordinates as determined from the latter-mentioned interpolating device. The operation of this compensating means is simultaneous with that of the interpolating device for control of the milling machine.

In accordance with the present invention if the profile to be cut is a circular arc, as shown in Figure 2, when the cutting tool is in the position 1 the output of the interpolating device is changed from signals representative of X and Y to signals representative of $X_c$ and $Y_c$ where $C(X_c, Y_c)$ is the centre of the circle of which the arc forms a part and the latter signals are stored to provide a constant output during the description of the arc whilst the compensating means has applied to it a signal representative of the sum of the radii of this circle and of the cutting tool, $R+r$ say, so that the axis of the cutting tool is caused to describe a circle of radius $R+r$ about C as instantaneous centre. Thus allowance is still made for the radius of the cutting tool.

The rotor of the $\phi$-resolver during the generation of the circular arc is rotated at a suitable velocity between $\phi_1$ and $\phi_2$ the values of $\phi$ at the ends of the circular arc. This velocity may be predetermined by suitable control signals on the programme, in dependence upon the total radius of curvature that is the total radius $R+r$, or automatically controlled by an overall feedback loop which takes account of the resolved errors in the servomotors controlling the cutting tool position and the instantaneous angular velocity of the rotor, as described for example in co-pending British Patent application No. 22,384/56.

The length of the arc described by the cutting tool may be determined in a variety of ways. For example the co-ordinates of the end point of the arc and thus the starting point of the next span may be stored and employed in conjunction with the normal position feedback signals which represent the actual displacements X and Y of the cutter axis, to resolve the difference vector between the position of the cutter and the end point of the span into the common tangent to the cutter and profile. When the resolved vector becomes zero, the normal mode of working is restored. The resolution of the difference vector in the required direction may be achieved by sine and cosine potentiometers. Alternatively, the interpolators which of course are not required to generate co-ordinates on the profile to be cut if a circular arc is required, may be employed to derive successive values for the angular displacement of the rotor of the cutter radius compensator during the cutting of the circular arc, by arranging the interpolators to generate a parabola which blends with the desired circular arc at the end points thereof.

However, any angular error $\delta \phi$ introduced at the beginning or end of the arc may produce an error in the resultant curve traced by the point P in the radial direction of the circular arc (that is, the normal to the desired curve) of $\frac{1}{2}R(\delta \phi)^2$ due to temporary loss of control of the cutter, which error becomes increasingly significant as R increases.

In a preferred embodiment of the present invention a further information track or information zone is added to the tape which serves to provide the programmed information applied to the interpolating device controlling the milling machine. In normal operation this additional track contains no information whilst two other tracks contain the X and Y information. At the beginning of a circular arc the additional track contains the angle $\phi_1$ (or alternatively the angle of the radius rotor) for the compensating means at this point, which point is defined in the corresponding positions of the other two tracks. In the next position along the tracks, the additional track contains the radius R of the required circular arc and the two original tracks contain $X_c$ and $Y_c$, the co-ordinates of the centre of the circle of which the arc forms part. The next position along the additional track contains the angle $\phi_2$ at the end point of the arc, which point is defined in the corresponding positions of the two original tracks. In the operation of this embodiment, R, $X_c$, $Y_c$ and $\phi_1$ are stored before the cutting tool arrives at the starting point of the arc. At the starting point interpolation of X and Y is switched out and $X_c$ and $Y_c$ are switched in from their respective stores to the appropriate output leads of the interpolating device whilst R is added to the signal $r$ already being applied to the compensating device. At this time also, the end point of the arc and $\phi_2$ are stored since in the interpolating device employed information is derived in groups of three positions from the information tracks, as described in the afore-mentioned co-pending United States application Ser. No. 581,038, now Patent No. 2,929,555. Thus $\phi_1$ and $\phi_2$ may be applied to an interpolating device for deriving $\phi$ accurately to drive a resolver employed for the generation of the arc by rotation of the cutting tool about the centre $(X_c, Y_c)$ of the arc as described above. The interpolating device for deriving $\phi$ may be linear or suitably non-linear if a particular velocity distribution is required for the cutting tool.

Figure 3 illustrates one example of the preferred embodiment described above in which reference 1 indicates a punched tape on which information is recorded. A tape reader 2 is applied to one track of the tape 1 on which information relating to the X-ordinates of reference points on a desired curve is coded and the reader 2 is arranged to transfer the coded information in cyclic order under the control of a program unit 3 to five temporary stores 4 to 8. Those stores comprise an auto-transformer the tap on which is set to derive an alternating voltage having an amplitude which is the analogue of the corresponding coded co-ordinate value. The stored signals are applied alternately in groups of three successive signals, the third signal of a group being the same as the first signal of the following group to form the input signals to a pair of interpolators or parabolic bridges via a selector switch 9. One of the bridges comprises an auto-transformer 10, ten regularly spaced points on which are connected to the ten studs of the studs 11. The connections from the auto-transformer 10 to the stud circle selectively include series of windings denoted in general by 12 which are inductively coupled to each other but not to the auto-transformer 10. The windings 12 are termed parabolic windings and have numbers of turns which are related to each other in accordance with a quadratic law, as described in co-pending United States application Ser. No. 459,814, now Patent No. 2,928,604. These windings are so arranged that when input signals represent the X co-ordinates of three reference points are applied to the bridge 10, 12 as shown the output signals at the studs 11 represent the X co-ordinates of relatively closely spaced points on a parabolic arc through the three reference points. The other bridge is of the same construction as that described and comprises auto-transformer 13 and parabolic windings 14 connected to the ten studs 11'. The studs 11 and 11' are shown for convenience in straight lines whereas in practice they are sequentially disposed so that alternate studs form two concentric circles.

These stud circles are each provided with two brushes of the make-before-break type 15 and 18, and 16 and 17 the pairs overlapping each other radially and being individually spaced apart by an angle equal to the angular spacing of neighbouring studs in the two circles considered as one. Thus, as the brushes 15 and 16 contact studs they derive voltages representing one interval of the parabolic arc and as they move off two studs the brushes 17 and 18 commence moving across two studs to derive voltages representing the succeeding interval of the parabolic arc, and so on in so-called "leap-frogging" manner. The voltage outputs from the brushes 15 and 16, and 17 and 18 are applied to two auto-transformers 20 and 21, respectively, which have regular tapping points connected to different halves of a stud circle 22, as shown. The stud circle 22 has half-studs at the ends of each half circle and the voltages from the brushes 15 to 18 are applied to the auto-transformers 20 and 21 in cyclic order. The stud circle 22 is provided with a single brush 23 on a shaft 24 so synchronised with the shaft 19 via gearing 25 that the brush 23 rotates through 180° as the brushes 15 to 18 rotate through the angular spacing of studs 11 and 11' and moves from one half of the circle 22 to the other as the brushes 15 to 18 "leap-frog."

Thus the output voltage X derived from the brush 23 represents linear sub-interpolation along successive intervals of the parabolic arcs derived from the two parabolic bridges.

Windings 26 and 27 connected in series are coupled to the auto-transformers 20 and 21, respectively, to successively derive voltages equally proportional to a parametric differential of X in successive intervals, in this case with respect to time, which voltages are applied to one stator 28 of a resolver. A similarly proportionate voltage to the time derivative of Y is derived from the similar interpolating arrangement employed to derive Y and is applied to the other stator 29 of this resolver so that the rotor 30 controls a shaft 31 by the use of an amplifier 32 and servo-motor 33, to rotate to an angle $$\tan^{-1} \frac{dY}{dX} = \phi$$

in well-known manner.

A further resolver comprising stators 34 and 35 and rotor 36 is disposed on the shaft 31 in similar manner to the resolver 28, 29 and 30, respectively, and a voltage representing the radius $r$ of a cutting tool, say, is applied to the rotor 36 so that the components $E_X$ and $E_Y$ of $r$ derived from the stators 34 and 35 are the necessary addenda to the X and Y outputs to compensate for the cutter radius in accordance with the specification of co-pending United States application Serial Number 524,720, now Patent No. 2,917,693. The stator 34 is connected across the primary winding of a transformer 70, the secondary winding of which is connected in the output lead from the brush 23 so as to add $E_X$ to X to form the corrected X output signal of the arrangement. The component $E_Y$ from the stator 35 is similarly added to the Y output derived from components which are identical with the components. The components for deriving the Y outputs are not shown in the drawings.

In accordance with the present invention the punched tape 1 is provided with an additional track, the information from which is applied by tape reader 2' in cyclic manner to stores 37 to 41 under the control of program unit 3 in similar manner to the stores 4 to 8. Assume that the left hand parabolic bridge is deriving signals representing the X co-ordinates of a parabolic arc defined by reference signals $X_1$, $X_2$ and $X_3$ from the stores 4, 5 and 6, respectively, and that during this derivation signals representing $X_c$, the X co-ordinate of the centre of a circular arc required to follow the parabolic arc being described, and $X_5$, the X co-ordinate of the first reference point of the parabolic arc to follow the circular arc, are applied to stores 7 and 8, respectively. Then, as signals $X_3$, $X_c$ and $X_5$ are applied to stores 6, 7 and 8 signals representing $\phi_1$, R and $\phi_2$ of Figure 2 are simultaneously derived from the additional tape track and applied to the stores 39, 40 and 41, respectively. The outputs from the stores 37 to 41 are applied via a selector switch 42 of the same construction and operation as switch 9 to six output leads forming two groups of three leads as is the case for switch 9. The outside leads of each group are connected to the ends of auto-transformers 43 and 44, respectively, in cyclic order, as for the ends of auto-transformers 10 and 13. These four output leads apply signals representing $\phi_1$ and $\phi_2$ to the auto-transformer 43 or 44 (in this case to 44) depending upon the position of the circular arc in the programming sequence. Regularly spaced tapping points on the auto-transformers 43 and 44 are connected to different halves of a stud circle 45 similar to circle 22 but the brush 46 of which on shaft 47 is rotated in synchronism with the brush 16 to derive signals representing interpolation of $\phi$ from $\phi_1$ to $\phi_2$. Thus as the brush 16 leaves the bottom stud of the half circle 11 the brush 23 has finished its 180° rotation to cause subinterpolation in the last interval finishing with a signal representing $X_3$ so the brush 46 commences interpolation at $\phi_1$ between $\phi_1$ and $\phi_2$ on the right half of the circle 45. The $\phi$ output from the brush 46 is applied to a difference circuit 48 the other input of which represents the analogue of the instaneous position of the shaft 31 and is obtained from a feedback potentiometer which, it may be assumed, is included in the components represented by the block 49. The output of the circuit 48 is applied via a suitable amplifier to a servo-motor included in the block 49 which motor is arranged to drive the shaft 31 during the generation of a circular arc.

The stored signal representing R is applied from the appropriate centre lead of the groups of output leads from the switch 42 (in this case the right hand group centre lead) to ground via coils 50 and 52 which are both coupled to a similar coil 51 disposed in the $r$ signal input lead.

During the generation of a circular arc it is necessary to switch out the normal X output and the input X to the $\phi$ resolver 28, 29 and 30. Similar requirements arise in the case of the X interpolator. It is necessary also to switch in the $X_c$ output from the centre lead of the appropriate group from switch 9 and the R and $\phi$ outputs derived from the additional tape track. This may be done in response to the R signal outputs from the switch 42. In the above case the right hand output lead is also applied via an amplifier 53 to a relay coil 54, which closes a preparatory switch 55 when the R signal is applied to one of the stores 37 to 41, here being the store 40. Since the R signal is derived during the generation of the preceding parabolic arc the switch 55 is closed before the circular arc is required and remains closed until a time during the generation of the succeeding parabolic arc when the store 40 is filled again (with 0 in the case of a parabolic arc) and the R signal is "erased." The switch 55 is connected between a positive voltage source and a brush 56 which is rotated in synchronism with the brush 46 and is centred on a semi-circular contact 57 in similar disposition to the right hand half of the circle 45. A lead from this contact 57 is connected to ground via a relay coil 58 which is thus energised during the required interval for the generation of the circular arc and is arranged to switch out the normal X output at switch 59 and $\phi$ generation by rotor 30 at switch 60 and to switch in the R signal at switch 61, the $\phi$ signal at switch 62, and the $X_c$ signal from the appropriate switch 9 output lead at switch 63.

A similar connection from the central lead of the left group from switch 42 is arranged to operate a preparatory switch which in conjunction with a semi-circular contact 64 rotated through 180° with respect to contact 57 energises a relay coil 65 to operate the same switches as relay coil 58 except that the $X_c$ signal is derived from the central lead of the left hand group from switch 9 at switch 66 instead of from the central lead from the right hand group, as above.

During the generation of the circular arc, the remaining reference co-ordinates $X_6$ and $X_7$ are applied to the stores 4 and 5 and the $X_5$, $X_6$ and $X_7$ signals are applied to the left hand parabolic bridge for the generation of the succeeding parabolic arc, which commences as the brush 56 leaves the contact 57 to de-energise the relay coil 58 and reset the switches to their normal positions, that is, those shown in Figure 3.

It will be appreciated that the normal Y signals and $Y_c$ are also derived from the tape reader 2 and applied to stores similar to those for the X signals and also as indicated a similar Y-interpolator and sub-interpolator are employed. The $\phi$ and R generation however are not duplicated. Furthermore the servo motor and the amplifier included in the components represented by the block 49 may be dispensed with and the output of the differencing circuit 48 may be used when the switch 59 is open and the switch 62 is closed to drive the servo motor 33 via the amplifier 32.

There may remain a "follow-up" error $\Delta\phi$ in the servo-motor control for the rotor of the $\phi$-resolver in the compensating means, which error may cause some inaccuracy if very large. This may be overcome by deriving a signal $(R+r)\Delta\phi$ and applying it to a further rotor winding on the resolver 34, 35, 36, said further winding having its magnetic axis perpendicular to the rotor winding 36. It can be shown that this further rotor winding substantially removes the error in question. The signal $\Delta\phi$ can be obtained from the amplifier which amplifies the output of the differencing circuit 48 servo-motor which generates $\phi$, and $(R+r)\Delta\phi$ can then be derived by attenuating $\Delta\phi$ by $(R+r)$.

In the above description with respect to Figure 2 it is supposed that the cutting tool generates, from "outside," a convex circular arc with respect to the workpiece (not shown). If the cutting tool is "inside" the workpiece the signal applied to the rotor of the compensating means is in a negative sense. Also concave circular arcs may be generated in a similar manner.

What we claim is:

1. A control device for automatic machine tools comprising means for deriving first signals variable to represent two co-ordinates of a series of points on a desired locus with respect to predetermined axes, means for resolving signals representing a radius to produce signals representing components of said radius in said two co-ordinate directions, means for adding said component signals to said first signals to derive control signals, means for discontinuing the derivation of said first signals and for substituting reduced signals of fixed values, and means for correspondingly increasing said radius signal during a period of discontinuation to produce further control signals representing two co-ordinates of points on a cicular arc extending from said locus.

2. A device according to claim 1 comprising means for deriving signals variable to represent the direction of the normal to a required circular arc during said period of discontinuation, and means for timing the rate of operation of said resolving means in response to the latter signals.

3. A device according to claim 2 comprising means for deriving from a record signals representing the normal directions at the beginning and at the end of the required circular arc, interpolation means responsive to the latter said signal for deriving signals which are variable to represent the direction of the normal to the required circular arc.

4. A device according to claim 1, wherein said means for deriving said first signals comprises two pairs of interpolating means each of said interpolating means including three input terminals and a plurality of output terminals interconnected by two transformers, one being of a quadratic law.

5. A device according to claim 4 wherein said reduced signals of fixed values are derived from the input terminals of said interpolating means under the control of said signals representing a further radius.

6. A device according to claim 1 comprising a store for a signal representing the increase of said radius signal, and means responsive to an output of said store for initiating discontinuation of the derivation of said first signals.

References Cited in the file of this patent

UNITED STATES PATENTS

| | | |
|---|---|---|
| 2,820,187 | Parsons et al. | Jan. 14, 1958 |
| 2,833,941 | Rosenberg et al. | May 6, 1958 |
| 2,894,186 | Cail et al. | July 7, 1959 |
| 2,929,555 | Spencer et al. | Mar. 22, 1960 |